C. W. VOLLMANN.
PIPE COUPLING OR JOINT.
APPLICATION FILED OCT. 1, 1915.
1,258,166.
Patented Mar. 5, 1918.
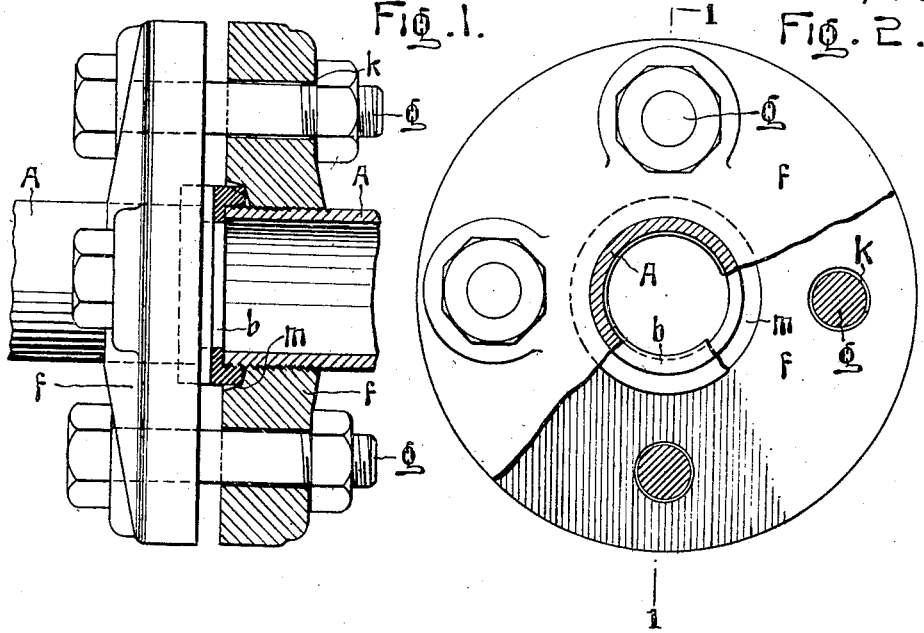
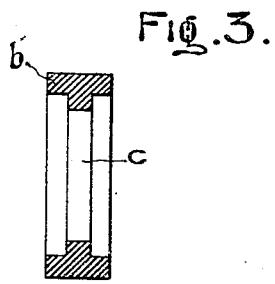
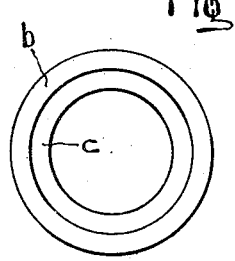
Witnesses:
Carl W. Vollmann
Inventor
per Attorney

UNITED STATES PATENT OFFICE.

CARL W. VOLLMANN, OF MONTREAL, QUEBEC, CANADA.

PIPE COUPLING OR JOINT.

1,258,166.　　　　Specification of Letters Patent.　　Patented Mar. 5, 1918.

Application filed October 1, 1915. Serial No. 53,662.

*To all whom it may concern:*

Be it known that I, CARL W. VOLLMANN, a subject of the King of Great Britain, residing in the city of Montreal, Province of Quebec, Dominion of Canada, have invented certain new and useful Improvements in Pipe Couplings or Joints; and I do hereby declare that the following is a full, clear, and exact description thereof.

Heretofore considerable loss and damage has been experienced by the blowing-out or otherwise breaking down of the joints of pipes for conveying high pressure fluids such as in refrigeration work, power plants and the like; and my invention has for its object to impart a measure of permanency to joints of this nature while at the same time permitting them to be readily opened. One reason why I obtain this result is that my joints or couplings need not be soldered.

To this end the invention may be said briefly to consist of means carried by the pipe-ends to be united, and constructed and arranged to clasp between them a distortable ring of relatively soft metal having an internal circumferential flange adapted to be inserted between the extremities of the pipe, the parts being so fashioned that when the pipe-ends are clamped together the ring is compressed, thereby causing the metal to flow into the threads and effectively seal the joint.

For full comprehension, however, of my invention reference must be had to the accompanying drawings forming a part of this specification in which similar reference characters indicate the same parts, and wherein:

Figure 1 is a side elevation of my improved coupling partly in section, the section being taken on line 1 1, Fig. 2;

Fig. 2 is a transverse sectional view of a pipe provided with my improved coupling, one of the clamping members thereof being broken away for illustration; and Figs. 4 and 3 are a face view and an axial sectional view, respectively, of the distortable ring.

The pipe-ends to be united are indicated at A A, the distortable ring at $b$ and the clamping devices at $f$.

The pipe-ends are screw-threaded and the clamping devices are preferably in the form of flanges screwed upon the pipe-ends and having holes $k$ through which clamping bolts $g$ are passed.

The distortable ring is of sufficient axial length to overlap the end portion of both pipe ends while an internal middle circumferential flange $c$ is engaged between the abutting pipe-ends. The internal circumference of the ring at either side of the flange $c$ is sufficient to slip over the threads of the pipe ends; and in order to accommodate the ends of the ring each of the flanges $f$ is centrally chambered as at $m$.

When the parts are assembled and bolts tightened the flanges come together and compress the ring between them thereby causing the metal of the ring to flow into the screw-threads and an effective high pressure joint secured.

In order to increase the tendency imparted to the metal to flow into the threads, the walls of the chambers are inclined to present tapered or inclined formation having a tendency to draw the metal of the ring toward the threads.

Although I have shown and described screw-threaded exteriors to the pipe-ends a single groove or two or more circumferential beads or similar engagement members may be used without departing from the spirit of my invention.

A joint or coupling such as above described will be of a permanent character when once assembled and until it is dismembered willfully; the result being that accidental blowing out is practically impossible.

What I claim is as follows:

1. In a pipe coupling or joint the combination with a pair of screw-threaded pipe-ends; of a relatively soft metal distortable ring having a middle flange adapted to be interposed between the pipe-ends for the purpose of locating the ring in proper overlapping relation to the pipe-ends, and the ends of the ring being adapted to overlap the screw-threads; a pair of flanges upon the respective pipe ends and having central chambers adapted to receive the ends of the ring; and means for clamping the flanges together.

2. In a pipe coupling or joint the combination with a pair of externally screw-threaded pipe-ends; of a relatively soft distortable ring having an internal middle flange adapted to be interposed between the pipe-ends; and the ends of the ring being adapted to overlap the screw-threads; a pair of flanges screwed upon the respective pipe ends and having central chambers adapted to receive the ends of the ring and when the said flanges are drawn together exert compressive action thereon to effect a tight joint between the flanges and the pipe-ends; and means for clamping the flanges together consisting of bolts passed through the flanges.

3. In a pipe coupling or joint the combination with a pair of screw-threaded pipe-ends; of a relatively soft metal distortable ring having a middle flange adapted to be interposed between the pipe-ends for the purpose of locating the ring in proper overlapping relation to the pipe-ends, and the ends of the ring being adapted to overlap the screw-threads; a pair of flanges upon the respective pipe ends and having central chambers with their walls inclined relatively to the outer periphery of the pipe-ends and adapted to receive the ends of the ring; and means for clamping the flanges together.

In testimony whereof I have signed my name to this specification in the presence of two witnesses.

CARL W. VOLLMANN.

Witnesses:
GORDON G. COOKE,
WILLIAM HEWETSON.

Copies of this patent may be obtained for five cents each, by addressing the "Commissioner of Patents, Washington, D. C."